UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

CASE-HARDENING MATERIALS.

1,308,239.     Specification of Letters Patent.     Patented July 1, 1919.

No Drawing.     Application filed October 15, 1917. Serial No. 196,636.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Case-Hardening Materials; and I do hereby declare that the following is a full, clear, and exact description thereof.

My invention refers to the art of cementation or case hardening, and more specifically to materials for use in such art.

It has been the practice from very early times to employ certain carbonaceous materials to change iron to steel, or to change the exterior of an article formed of steel to a different degree of hardness from the interior portion. Since the best active case hardening materials are more or less expensive, persons working in the art have endeavored to form a material by a combination of different elements, which will be as efficient and cheaper than the more expensive carbonaceous materials which are in themselves active. By active is meant those materials which, without the addition of other substances, will give off the requisite amount of carbon when heated in the presence of articles to be cemented.

In carrying out this idea, inactive carbonaceous materials, which are relatively cheaper, have an energizing material added thereto in suitable proportion, such energizing substance being any material, not necessarily carbonaceous, as will, when added to an inactive carbonaceous material, render such material active as a cementing agent.

I have improved upon the ordinary cementation material by varying the proportion of the ordinary constituents and, also, by adding new substances thereto. My preferred method consists in mixing with charcoal, petroleum carbon, soda ash, lime stone, mineral oil, and a small quantity of bone black. Charcoal and petroleum carbon are very rich in the necessary carbon, but are themselves inactive, and it is therefore essential that an energizing material such as lime stone be added thereto.

The petroleum carbon, which I have found to be an important addition to the usual case hardening material is a by-product in the refinement of crude oil, it being the residue which is left after all distillates and other volatile matters have been driven off. It is found attached to the walls of the vessels in which the refinement takes place, and is scraped therefrom in any suitable manner, after which it is ground to appropriate size for use in my case hardening material. This petroleum carbon has very little use in other industries, and, therefore, can be obtained very cheaply, this being one reason for its use.

The mineral oil, which has been found to be best adapted for use in my compound, is formed by adding kerosene to machine oil, the idea being to procure a rather thin oil. The small quantity of bone black is added to render the other constituents more active, and, therefore, more efficient. Prior to mixing the ingredients, the soda ash and lime stone are reduced to a powdered form.

I have prepared a very satisfactory material containing the foregoing elements by combining the same in the following proportion:

24 pounds of charcoal,
6 pounds of petroleum carbon,
½ pound of soda ash,
½ pound of calcium carbonate,
1 cup of machine oil,
4 cups of kerosene, and
4 tablespoons full of bone black.

This compound is used in the ordinary manner by embedding therein the articles to be cemented and subsequently heating the whole to proper degree.

It is noted that I have provided two major carbonaceous materials, the charcoal being practically all carbon, while the petroleum carbon, commercially so called, contains from eighty to ninety per cent. of carbon. This petroleum carbon yields carbon gas in a more reluctant manner than the charcoal and a maximum admixture thereof with charcoal is employed under the existent working conditions to supply an adequate amount of carbon gas. In addition to thus reducing the cost of the compound by reason of the relative cheapness of the petroleum carbon, the cellular structure of the petroleum carbon, which is retained in the cementation operation procures a porous nature of the mass of the compound which facilitates the permeation of the gases. Without the use of this petroleum carbon, the charcoal and remaining ingredients would become so massed as to retard the action of the gases and thus prolong the cementing operation.

A further important feature of the petroleum carbon is the slight shrinkage thereof which occurs in the cementing operation, as compared to charcoal or other carbonaceous materials. The soda ash employed in the compound serves its usual scavenging or cleaning function so that the work articles present a smooth desired surface when removed from the compound.

By pulverizing the soda ash and limestone, and using the oil of the compound as a vehicle, the commingled soda ash and limestone are distributed as a coating over the particles of charcoal and petroleum carbon.

I claim:—

1. The herein described cementing material containing charcoal and petroleum carbon in proportions of substantially four to one, together with an energizing substance.

2. The herein described cementing material containing the following materials united in substantially the following proportions: 24 pounds of charcoal, 6 pounds of petroleum carbon, $\frac{1}{2}$ pound of soda ash, $\frac{1}{2}$ pound calcium carbonate, 5 cups of oil.

In testimony that I claim the foregoing I have hereunto set my hand at Milwaukee, in the county of Milwaukee and State of Wisconsin.

WILLIAM S. HARLEY.